UNITED STATES PATENT OFFICE.

OSCAR BALLY AND MAX HENRY ISLER, OF MANNHEIM, GERMANY, ASSIGNORS TO BADISCHE ANILIN & SODA FABRIK, OF LUDWIGSHAFEN-ON-THE-RHINE, GERMANY, A CORPORATION.

VIOLET DYE AND PROCESS OF MAKING SAME.

No. 809,892. Specification of Letters Patent. Patented Jan. 9, 1906.

Application filed January 31, 1905. Serial No. 243,571.

*To all whom it may concern:*

Be it known that we, OSCAR BALLY and MAX HENRY ISLER, citizens of the Swiss Republic, residing at Mannheim, in the Grand Duchy of Baden, German Empire, have invented new and useful Improvements in New Coloring-Matters and Processes of Producing the Same, of which the following is a specification.

New compounds of the anthracene series can be obtained by condensing certain anthracene compounds with glycerin. (See Letters Patent Nos. 786,085, 787,859, and 798,105.) The anthracene compounds which can be used include anthracene itself, its meso-oxy and hydroxy derivatives and also the sulfo-acids of any of these compounds—for example, anthraquinon, anthranol, oxanthranol, the anthracene sulfo-acids, and anthraquinon sulfo-acids, also homologues of anthracene. Further, beta-amido-anthraquinon and other amido-anthraquinons which contain an amido group in the beta position and also sulfo-acids of the beta-amido-anthraquinons can also be condensed with glycerin. Also instead of anthraquinon, naphthanthraquinon, or its hydro derivatives may be employed, and, further, instead of any of the above-mentioned compounds their homologues may be used. These new compounds are called "benzanthrones," and all probably contain the benzanthrone group to which the following formula is attributed:

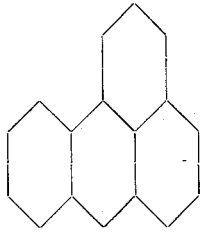

The benzanthrones obtained from the beta-amido-anthraquinons may contain in addition a quinolin ring, while those obtained from the naphthanthraquinon bodies contain an additional benzene ring and may conveniently be termed "benznaphthanthrones." We have now discovered that these new benzanthrones upon being treated with caustic alkali yield valuable coloring-matters possessing dyeing properties which are similar to those of indanthrene—that is to say, they cannot be used directly for dyeing, because they are insoluble in water; but on treatment with an alkaline reducing agent—for instance, alkaline hydrosulfite—they yield soluble leuco compounds which dye vegetable fiber shades which on washing with water become fixed, being reconverted into the insoluble coloring-matter. The condensation products obtained from hydroxyanthraquinons and glycerin, although they contain the benzanthrone grouping, do not yield our new coloring-matters on being treated with caustic alkali.

The new coloring-matters which we desire to claim generically can be recognized as follows: They dissolve in concentrated sulfuric acid, yielding from green to violet solutions, and they dissolve in alkaline hydrosulfite, yielding from blue to reddish-brown vats which dye vegetable fiber, substantively giving red-blue to green-blue shades.

The new coloring-matters which we desire to claim specifically are those which can be obtained by treating with caustic alkali the condensation product from a beta-amido-anthraquinon body and in particular beta-amido-anthraquinon itself and glycerin. These are soluble in concentrated sulfuric acid, giving green to blue solutions, and they dissolve in alkaline hydrosulfite, yielding blue vats which dye vegetable fiber, substantively giving violet shades. In particular the coloring-matter obtainable from beta-amido-anthraquinon itself gives a blue solution in concentrated sulfuric acid.

We do not wish to claim specifically in this patent the coloring-matters which can be obtained by treating with caustic alkali the condensation products from an anthraquinon body which does not contain nitrogen and glycerin and also the condensation products from a naphthanthraquinon body and glycerin. These are claimed specifically in the applications Serial No. 282,217, filed October 10, 1905, and Serial No. 282,356, filed October 11, 1905, for Letters Patent, being divisions of this present application pursuant to the requirement of the Patent Office.

The following examples will serve to further illustrate the nature of our invention, which, however, is not confined to these examples. The parts are by weight.

*Example 1—Conversion of the condensation product from beta-amido-anthraquinon and glycerin into coloring-matter.*—Introduce one (1) part of the condensation product obtainable from beta-amido-anthraquinon, glycerin, and sulfuric acid into six (6) parts of melted potassium hydrate at a temperature of about one hundred and fifty degrees centigrade, (150° C.) Raise the temperature while continuously stirring to from two hundred and twenty-five to two hundred and thirty degrees centigrade (225° to 230° C.) and maintain this temperature until a test portion dissolved in water shows that no more coloring-matter is being formed. Treat the melt with about fifty (50) times its volume of water and boil. Then filter while hot and wash the precipitate with hot water. In this way a dark-violet-brown paste is obtained. The coloring-matter is insoluble in water. The unpurified product dissolves in concentrated sulfuric acid, the solution being a dirty olive with a yellow-green fluorescence, while after being crystallized from nitrobenzene it yields a blue solution without fluorescence. The coloring-matter is insoluble in caustic soda; but on being warmed with alkaline hydrosulfite solution it yields a blue-colored vat, which dyes vegetable fiber pure blue. On washing, the color changes slowly into violet. The shades so obtained possess excellent fastness against the action of light, chlorin, and soap. Instead of potassium hydrate in this example other caustic alkalies or mixtures of caustic alkalies, with or without the addition of indifferent diluting agents, can be employed. The reaction proceeds very quietly and favorably at a lower temperature when very concentrated alcoholic potash is used.

*Example 2—Conversion of the condensation product from beta-amido-anthraquinon-sulfoacid into coloring-matter.*—Introduce one (1) part of the condensation product obtainable from beta-amido-anthraquinon-sulfo-acid, glycerin, and sulfuric acid into six (6) parts of melted potassium hydrate at a temperature of about one hundred and ten degrees centigrade (110° C.) and then while continuously stirring raise the temperature to from about two hundred and thirty to two hundred and thirty-five degrees centigrade, (230° to 235° C.) Maintain this temperature until a test portion of melt shows that no more coloring-matter is being formed. Then pour the reaction mixture into water and boil. Filter while hot, boil the precipitate with dilute sulfuric acid, filter again, and wash with hot water until the filtrate is no longer of a yellow color. In this way there is obtained a violet-brown paste which is completely insoluble in hot water and in dilute caustic soda. The sulfo group has therefore been split off during the formation of the coloring-matter, which apparently possesses properties identical with those of the coloring-matter obtained according to the foregoing example. Similar coloring-matters are obtained when the condensation products from 2.6- and 2.7-diamido-anthraquinon are melted with potash. The unpurified coloring-matters are brown-black powders, which dissolve in concentrated sulfuric acid, the solution being olive-colored, with a weak brown-green fluorescence. They are insoluble in water, alcohol, and acetic acid, but are soluble in boiling nitrobenzene, the solution being blue green, with a beautiful brownish-red fluorescence. From this nitrobenzene solution they crystallize out in reddish-violet flakes, which dissolve in concentrated sulfuric acid, the solution being a pure blue green.

Now what we claim is—

1. The process for the production of anthracene coloring-matters by treating with caustic alkali a hereinbefore-defined benzanthrone compound.

2. The process for the production of anthracene coloring-matters by treating with caustic alkali a hereinbefore-defined benzanthrone compound, obtainable by condensing together a beta-amido-anthraquinon body and glycerin.

3. The process for the production of anthracene coloring-matters by treating with caustic alkali a hereinbefore-defined benzanthrone compound, obtainable by condensing together beta-amido-anthraquinon and glycerin.

4. As new articles of manufacture, the anthracene coloring-matters which can be obtained by treating with caustic alkali a benzanthrone, which coloring-matters dissolve in concentrated sulfuric acid yielding from green to violet solutions, and which dissolve in alkaline hydrosulfite yielding from blue to reddish-brown vats which dye vegetable fiber substantively giving red-blue to green-blue shades.

5. As new articles of manufacture, the anthracene coloring-matters which can be obtained by treating with caustic alkali a benzanthrone obtainable by condensing together a beta-amido-anthraquinon body and glycerin, which coloring-matters dissolve in concentrated sulfuric acid yielding from green to blue solutions, and which dissolve in alkaline hydrosulfite yielding blue vats which dye vegetable fiber substantively giving violet shades.

6. As a new article of manufacture, the anthracene coloring-matter which can be obtained by treating with caustic alkali the benzanthrone obtainable by condensing together beta - amido - anthraquinone and glycerin, which coloring-matter dissolves in concentrated sulfuric acid yielding a blue solution and which dissolves in alkaline hydrosulfite yielding a blue vat, which dyes vegetable fiber substantively giving violet shades.

In testimony whereof we have hereunto set our hands in the presence of two subscribing witnesses.

OSCAR BALLY.
MAX HENRY ISLER.

Witnesses:
J. ALEC. LLOYD,
JOS. H. LEUTE.